US010531465B2

(12) United States Patent
Costa et al.

(10) Patent No.: US 10,531,465 B2
(45) Date of Patent: Jan. 7, 2020

(54) COMMUNICATION DEVICE, ACCESS NODE AND METHODS THEREOF (71) Applicant: Huawei Technologies Co., Ltd., Shenzhen (CN)

(72) Inventors: Mario Costa, Helsinki (FI); Philip Ginzboorg, Helsinki (FI); Gunnar Hedby, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 15/706,154

(22) Filed: Sep. 15, 2017

(65) Prior Publication Data
US 2018/0007678 A1    Jan. 4, 2018

Related U.S. Application Data (63) Continuation of application No. PCT/EP2015/055502, filed on Mar. 17, 2015.

(51) Int. Cl.
H04W 72/04    (2009.01)
H04W 88/08    (2009.01)

(52) U.S. Cl.
CPC .......... H04W 72/046 (2013.01); H04W 88/08 (2013.01)

(58) Field of Classification Search
None
See application file for complete search history.

(56) References Cited

U.S. PATENT DOCUMENTS

2005/0135403 A1*  6/2005  Ketchum ............... H04L 29/06
                                                      370/437
2007/0206504 A1*  9/2007  Koo .................... H04B 7/0408
                                                      370/245

(Continued)

FOREIGN PATENT DOCUMENTS

CN    101227242 A    7/2008
CN    104202074 A    12/2014

(Continued)

OTHER PUBLICATIONS

Nurmela et. al., "Initial channel models based on measurements—Deliverable D1.2," METIS, ICT-317669-METIS/D1.2, pp. i-140, Seventh Framework Programme (2014).

(Continued)

Primary Examiner — Brian S Roberts
(74) Attorney, Agent, or Firm — Leydig, Voit & Mayer, Ltd.

(57) ABSTRACT

The present invention relates to a communication device and an access node. The communication device comprises: a processor, and directional antennas; wherein the directional antennas are configured to receive a first signal $S_1$ indicating a calibration request (CR) for an access node; wherein the processor is configured to generate directional beacon signals $S_{DB}$ in response to the calibration request (CR); wherein the directional antennas are further configured to transmit the directional beacon signals $S_{DB}$ towards the access node (300). The access node (300) comprises: a processor, and an antenna array; wherein the antenna array is configured to receive directional beacon signals $S_{DB}$ from at least one communication device; wherein the processor is configured to calibrate the antenna array based on the directional beacon signals $S_{DB}$.

6 Claims, 6 Drawing Sheets

200

202 — Receiving a first signal $S_1$ indicating a calibration request for an access node 300

204 — Generating directional beacon signals $S_{DB}$ in response to the calibration request 206 — Transmitting the directional beacon signals $S_{DB}$ towards the access node 300

(56) References Cited

U.S. PATENT DOCUMENTS

| | | | |
|---|---|---|---|
| 2010/0150013 A1* | 6/2010 | Hara | H04L 25/0224 370/252 |
| 2010/0277363 A1* | 11/2010 | Kainulainen | G01S 3/023 342/174 |
| 2011/0045785 A1 | 2/2011 | Sutskover et al. | |
| 2015/0016555 A1 | 1/2015 | Swope et al. | |

FOREIGN PATENT DOCUMENTS

| | | |
|---|---|---|
| WO | 2009066132 A1 | 5/2009 |
| WO | 2010141925 A1 | 12/2010 |
| WO | 2014169934 A1 | 10/2014 |

OTHER PUBLICATIONS

Kyosti et. al., "IST-4-027756 WINNER II; D1.1.2 V1.1 WINNER II Channel Models: Part 1 Channel Models," WINNER 2007, pp. 1-82, Information Society Technologies (Sep. 2007).

Viberg et al., "Calibration in array processing", Classical and Modern Direction-of-Arrival Estimation, Chapter 3, pp. 93-124, Academic Press, Burlington, MA, USA, (2009).

Shen et al., "User Equipment Positioning," LTE: the UMTS Long Term Evolution, Chapter 19, pp. 423-436, John Wiley and Sons Ltd., UK, (2011).

Kay "Fundamentals of Statistical Signal Processing: Estimation Theory," Prentice Hall Signal Processing Series, pp. vii-595 (1993).

* cited by examiner

202 Receiving a first signal $S_1$ indicating a calibration request for an access node 300

204 Generating directional beacon signals $S_{DB}$ in response to the calibration request

206 Transmitting the directional beacon signals $S_{DB}$ towards the access node 300

402 Receiving directional beacon signals $S_{DB}$ from at least one communication device 100

404 Calibrating the antenna array 304 based on the directional beacon signals $S_{DB}$

COMMUNICATION DEVICE, ACCESS NODE AND METHODS THEREOF

CROSS-REFERENCE TO RELATED APPLICATIONS

This application is a continuation of International Application No. No. PCT/EP2015/055502, filed on Mar. 17, 2015, the disclosure of which is hereby incorporated by reference in its entirety.

TECHNICAL FIELD

Embodiments of the present invention relate to a communication device and an access node. Furthermore, the embodiments also relate to corresponding methods, a computer program, and a computer program product.

BACKGROUND

In wireless communication systems, Uplink (UL) signals transmitted by User Nodes (UNds) and received by Access Nodes (ANs) having antenna arrays that are affected by the scattering environment and in particular by the reflections of physical obstacles, such as buildings, vehicles, as well as mounting device for the ANs. These propagation effects may include cross-polarization and mutual coupling well know in the art. Knowledge of the overall influence of these propagation effects or imperfections to the antenna arrays is not required for Multiple Input Multiple Output (MIMO) communication purposes or for positioning based on Time-of-Arrival (ToA). Examples of UNds are User Equipments in Long Term Evolution (LTE) terminology and examples of ANs are base stations and access points.

However, information about such imperfections is needed in order to achieve highly accurate positioning of UNds based on Angle-of-Arrival (AoA). This operation is called calibration of the antenna array or antenna calibration. If the calibration of the antenna arrays is not performed, the AoA estimates cannot be used for positioning. Calibration of the antenna array means acquiring the behaviour of the antenna array, and in particular how the antenna array reacts to radio signals from different directions/locations in an area of the wireless communication system. The calibration of the antenna array is in this respect a software procedure.

The following conventional solutions can be used for calibrating antenna arrays:
 The calibration of the antenna array is performed in anechoic chambers;
 The propagation channel is estimated along with the calibration of the antenna array, which is known as auto-calibration;
 Dedicated measurement campaigns on the site where the antenna array is deployed; and
 UL data transmissions using precoding and/or beamforming for antenna array calibration.

The aforementioned conventional solutions however have quite a few limitations.

Calibrating the antenna array in an anechoic chamber does not acquire the influence of the mounting platform or other mounting devices where the antenna array is deployed e.g., a lamppost, etc.

Auto-calibration techniques are not practical due to the large amount of imperfections and typically lead to ill-conditioned problems.

Dedicated measurement campaigns are expensive and time-consuming. For example, in ultra-dense wireless communication systems there are in the order of 300 antenna arrays (each of which is mounted on a different lamppost) per square kilometres. In order to calibrate a single antenna array, many dedicated measurements taken in different locations need to be done. The number of measurements needed per antenna array depends on the desired density of the angular grid. For an angular grid of 1 degree, then 360×180 measurements are required. A high density of the angular grid leads to a more accurate location estimates.

In UL data transmissions, the data symbols are not typically known by the network. In antenna array calibration the UL signal needs to be known by the network in order to avoid gain and phase ambiguities. Moreover, most precoders and beamformers used in MIMO wireless communications exploit the multipath components of the channel for multiplexing or diversity gains. However, this is not desirable in antenna array calibration. In fact, in antenna array calibration the power of the multipath components should be minimized. Ideally, the UNd allocates power only to the LoS component between the UNd and the antenna array.

SUMMARY

An objective of embodiments of the present invention is to provide a solution which mitigates or solves the drawbacks and problems of conventional solutions.

Another objective of embodiments of the present invention is to provide a solution for improved calibration of antenna arrays.

An "or" in this description and the corresponding claims is to be understood as a mathematical OR which covers "and" and "or", and is not to be understand as an XOR (exclusive OR).

The above objectives are solved by the subject matter of the independent claims. Further advantageous implementation forms of the present invention can be found in the dependent claims.

According to a first aspect of the invention, the above mentioned and other objectives are achieved with communication device for a wireless communication system, the communication device comprising:
 a processor, and
 directional antennas;
 wherein the directional antennas are configured to receive a first signal $S_1$ indicating a calibration request for an access node;
 wherein the processor is configured to generate directional beacon signals $S_{DB}$ in response to the calibration request;
 wherein the directional antennas further are configured to transmit the directional beacon signals $S_{DB}$ towards the access node.

The communication device may be a user device or an access node for wireless communications. The communication device should have directional antennas and have the capability to transmit directional beacon signals $S_{DB}$ towards an access node in the wireless communication system.

The present communication device configured to transmit directional beacon signals $S_{DB}$ towards an access node in response to reception of calibration request from the access node implies a number of advantages over conventional solutions.

The present communication device makes possible a solution to calibrate antenna arrays deployed in wireless networks in a manner that is fast, robust, cost-efficient, and takes the influence of propagation obstacles into account. Dedicated measurement campaigns are thus not needed nor required any more. This is particularly important due to the large density of Remote Radio Units (RRUs) that is expected in future wireless communication systems such as 5G. RRUs may be understood as the access nodes (or base stations) of a centralized radio access network. Further, improved positioning accuracy is possible with the communication device according to the first aspect.

Therefore, every communication device having directional antennas can be used as calibration nodes, no matter if the communication device is static or moving. Hence, the calibration operation at the access node can be done continuously and at the same time the wireless communication system is under normal operation. This means cost saving and less disturbance to the operation of the wireless communication system.

In a first possible implementation form of a communication device according to the first aspect, the first signal $S_1$ further indicates the spatial position of the access node.

With this implementation form the communication device has not to calculate the spatial position of the access node. Thereby, faster transmission of the directional beacon signal is possible and also less processing resources of the communication device is needed.

In a second possible implementation form of a communication device according to the first possible implementation form of the first aspect or to the first aspect as such, the first signal $S_1$ further indicates the direction from the communication device towards the access node.

With this implementation form even faster transmission of the directional beacon signal is possible and also even less processing resources of the communication device is needed since the direction is given in the first signal $S_1$.

In a third possible implementation form of a communication device according to the first or second possible implementation forms of the first aspect or to the first aspect as such, the directional antennas further are configured to receive a second signal $S_2$ from the access node, the second signal $S_2$ indicating a mobility beacon request, and the directional antennas further are configured to transmit a mobility beacon signal $S_{MB}$ to the access node in response to the mobility beacon request.

With this implementation form it is possible for the access node to calculate the position of the communication device. The position of the communication device is used by the access node for calibration of its antenna array. With this implementation form it is also possible to estimate the radio channel between the communication device and the access node.

In a fourth possible implementation form of a communication device according to any of the preceding possible implementation forms of the first aspect or to the first aspect as such, the directional beacon signals $S_{DB}$ are transmitted in common transmission frequency bands.

The common transmission frequency bands should be understood such that the directional antennas of the communication device and the antenna array of the access node use the same transmission frequency bands for calibration signalling.

With this implementation form it is possible to acquire the frequency dependency effects of the antenna array of the access node.

According to a second aspect of the invention, the above mentioned and other objectives are achieved with an access node for a wireless communication system, the access node comprising:

a processor, and
an antenna array;
wherein the antenna array is configured to receive directional beacon signals $S_{DB}$ from at least one communication device;
wherein the processor is configured to calibrate the antenna array based on the directional beacon signals $S_{DB}$.

The present access node configured to receive directional beacon signals $S_{DB}$ and use them for calibrating the antenna array implies a number of advantages over conventional solutions.

The present access node can calibrate the antenna arrays in a manner that is fast, robust, cost-efficient, and takes the influence of propagation obstacles into account. This is not possible with conventional solutions.

Dedicated measurement campaigns are thus not needed nor required any more in wireless communications system comprising access nodes according to embodiments of the present solution. This is particularly important due to the large density of RRUs that is expected in future wireless communication systems such as 5G.

Every communication device having directional antennas can be used, by the access node, as calibration nodes. It does not matter if the communication device is static or moving. Hence, the calibration operation at the access node can be done continuously and at the same time the wireless communication system is under normal operation. Therefore, cost saving and time saving calibration in wireless communication systems is possible.

In a first possible implementation form of an access node according to the second aspect, the antenna array further is configured to transmit a first signal $S_1$ to the communication device, the first signal $S_1$ indicating a calibration request for the access node.

With this implementation form the access node can control when calibration should take place.

In a second possible implementation form of an access node according to the first possible implementation form of the second aspect or to the second aspect as such, the first signal $S_1$ further indicates the spatial position of the access node.

With this implementation form the communication device does not have to calculate the spatial position of the access node. Thereby, faster transmission of the directional beacon signal is possible and also less processing resources of the communication device is needed.

In a third possible implementation form of an access node according to the first or second possible implementation form of the second aspect or to the second aspect as such, the first signal $S_1$ further indicates the direction from the communication device towards the access node.

With this implementation form even faster transmission of the directional beacon signal is possible and also even less processing resources of the communication device is needed since the direction is given in the first signal $S_1$.

In a fourth possible implementation form of an access node according to any of the preceding possible implementation forms of the second aspect or to the second aspect as such, the antenna array further is configured to transmit a second signal $S_2$ to the communication device, the second signal $S_2$ indicating a mobility beacon request, and the antenna array further is configured to receive a mobility beacon signal $S_{MB}$ from the communication device; and the processor further is configured to estimate the spatial position of the communication device based on the mobility beacon signal $S_{MB}$, and the processor further is configured to use the estimated spatial position of the communication device when calibrating the antenna array.

With this implementation form it is possible for the access node to calculate the position of the communication device. The position of the communication device is used by the access node for calibration of its antenna array.

In a fifth possible implementation form of an access node according to the fourth possible implementation form of the second aspect, the processor further is configured to estimate the spatial position of the communication device using a time-of-arrival method or an observed time-of-arrival method.

With this implementation form by using mentioned methods very accurate estimations are possible thereby further improving the calibration of the antenna array.

In a sixth possible implementation form of an access node according to any of the preceding possible implementation forms of the second aspect or to the second aspect as such, the processor further is configured to calibrate the antenna array using a calibration algorithm based on an effective aperture distribution function, EADF, of the antenna array.

With this implementation form the calibration procedure of the antenna array can be made faster.

According to a third aspect of the invention, the above mentioned and other objectives are achieved with a method for a wireless communication system, the method comprising;

receiving a first signal $S_1$ indicating a calibration request for an access node, generating directional beacon signals $S_{DB}$ in response to the calibration request, and transmitting the directional beacon signals $S_{DB}$ towards the access node.

In a first possible implementation form of a method according to the third aspect, the first signal $S_1$ further indicates the spatial position of the access node.

In a second possible implementation form of a method according to the first possible implementation form of the third aspect or to the third aspect as such, the first signal $S_1$ further indicates the direction from the communication device towards the access node.

In a third possible implementation form of a method according to the first or second possible implementation forms of the third aspect or to the third aspect as such, the method further comprises receiving a second signal $S_2$ from the access node, the second signal $S_2$ indicating a mobility beacon request, and transmitting a mobility beacon signal $S_{MB}$ to the access node in response to the mobility beacon request.

In a fourth possible implementation form of a method according to any of the preceding possible implementation forms of the third aspect or to the third aspect as such, the directional beacon signals $S_{DB}$ are transmitted in common transmission frequency bands.

According to a fourth aspect of the invention, the above mentioned and other objectives are achieved with a method for a wireless communication system, the method comprising:

receiving directional beacon signals $S_{DB}$ from at least one communication device;

calibrating the antenna array based on the directional beacon signals $S_{DB}$.

In a first possible implementation form of a method according to the fourth aspect, the method further comprises transmitting a first signal $S_1$ to the communication device, the first signal $S_1$ indicating a calibration request for the access node.

In a second possible implementation form of a method according to the first possible implementation form of the fourth aspect or to the fourth aspect as such, the first signal $S_1$ further indicates the spatial position of the access node.

In a third possible implementation form of a method according to the first or second possible implementation form of the fourth aspect or to the fourth aspect as such, the first signal $S_1$ further indicates the direction from the communication device towards the access node.

In a fourth possible implementation form of a method according to any of the preceding possible implementation forms of the fourth aspect or to the fourth aspect as such, the method further comprises transmitting a second signal $S_2$ to the communication device, the second signal $S_2$ indicating a mobility beacon request, and receiving a mobility beacon signal $S_{MB}$ from the communication device; and estimating the spatial position of the communication device based on the mobility beacon signal $S_{MB}$, and using the estimated spatial position of the communication device when calibrating the antenna array.

In a fifth possible implementation form of a method according to the fourth possible implementation form of the fourth aspect, the method further comprises estimating the spatial position of the communication device using a time-of-arrival method or an observed time-of-arrival method.

In a sixth possible implementation form of a method according to any of the preceding possible implementation forms of the fourth aspect or to the fourth aspect as such, the method further comprises calibrating the antenna array using a calibration algorithm based on an effective aperture distribution function, EADF, of the antenna array.

The advantages of the methods according to the third aspect or the fourth aspect are the same as those for the corresponding device claims according to the first and second aspects.

The present invention also relates to a computer program with a program code, which when runs by a processor causes said processor to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
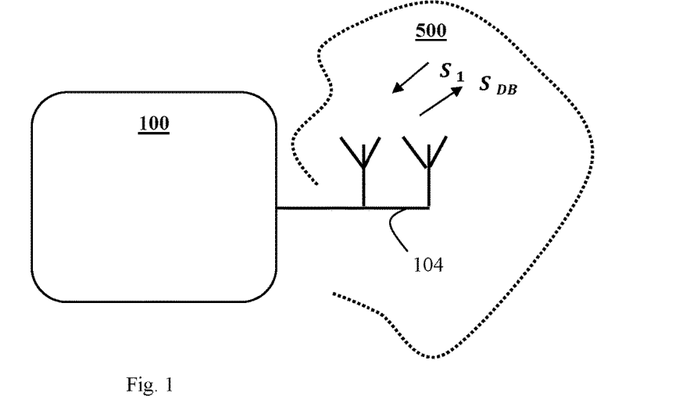
FIG. 1 shows a communication device according to an embodiment of the present invention.

FIG. 1 shows a communication device 100 according to an embodiment of the present invention. The communication device 100 comprises a processor 102 and directional antennas 104. The directional antennas 104 are configured to transmit and receive wireless communication signals in a wireless communication system 500. Especially, the directional antennas 104 are configured to transmit and receive wireless communication signals to, and from, one or more access nodes of the wireless communication system 500.

The processor 102 of the communication device 100 is coupled via an optional transceiver unit 106 (dashed lines) in the embodiment shown in FIG. 1. The directional antennas 104 are further configured to receive a Calibration Request (CR) comprised in a first signal $S_1$ transmitted by an access node. The CR is a request from the access node 300 (see e.g. FIG. 3) which wants to calibrate its antenna array.

The CR is forwarded by the transceiver 106 to the processor 102 of the communication device for further processing. The processing of the processor 102 includes generating directional beacon signal(s) $S_{DB}$ in response to the reception of the CR. The directional beacon signal(s) $S_{DB}$ is forwarded from the processor 102 to the directional antennas 104. The directional antennas 104 are configured to transmit the beacon signal(s) $S_{DB}$ towards the access node in the wireless communication system 500.

Figure 2:
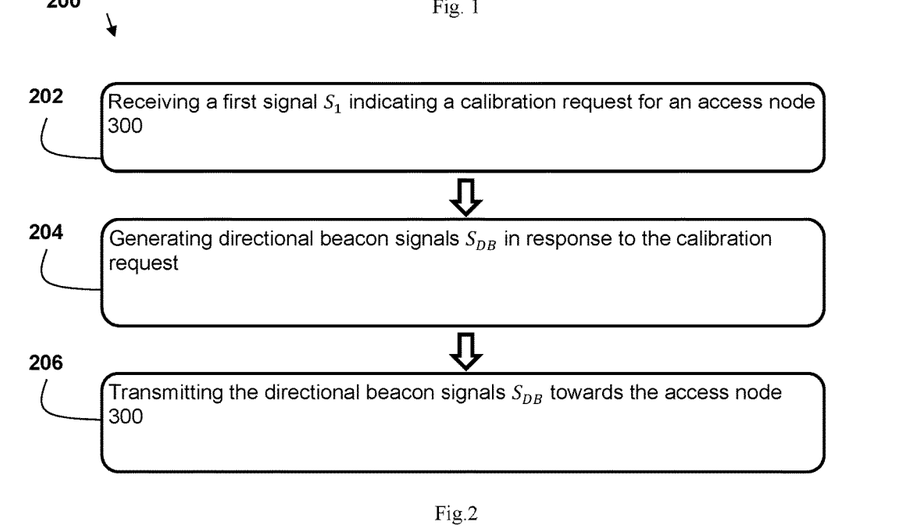
FIG. 2 shows a method according to an embodiment of the present invention.

FIG. 2 shows a corresponding method according to an embodiment of the present invention. The method 200 may 200 be executed in a communication device 100, such as the one shown in FIG. 1. The method 200 comprises the step of receiving 202 a first signal $S_1$ indicating a CR for an access node. The method further comprises the step of generating 204 directional beacon signals $S_{DB}$ in response to the CR. The method 200 finally comprises the step of transmitting 206 the directional beacon signals $S_{DB}$ towards the access node.

Figures 3, 4:
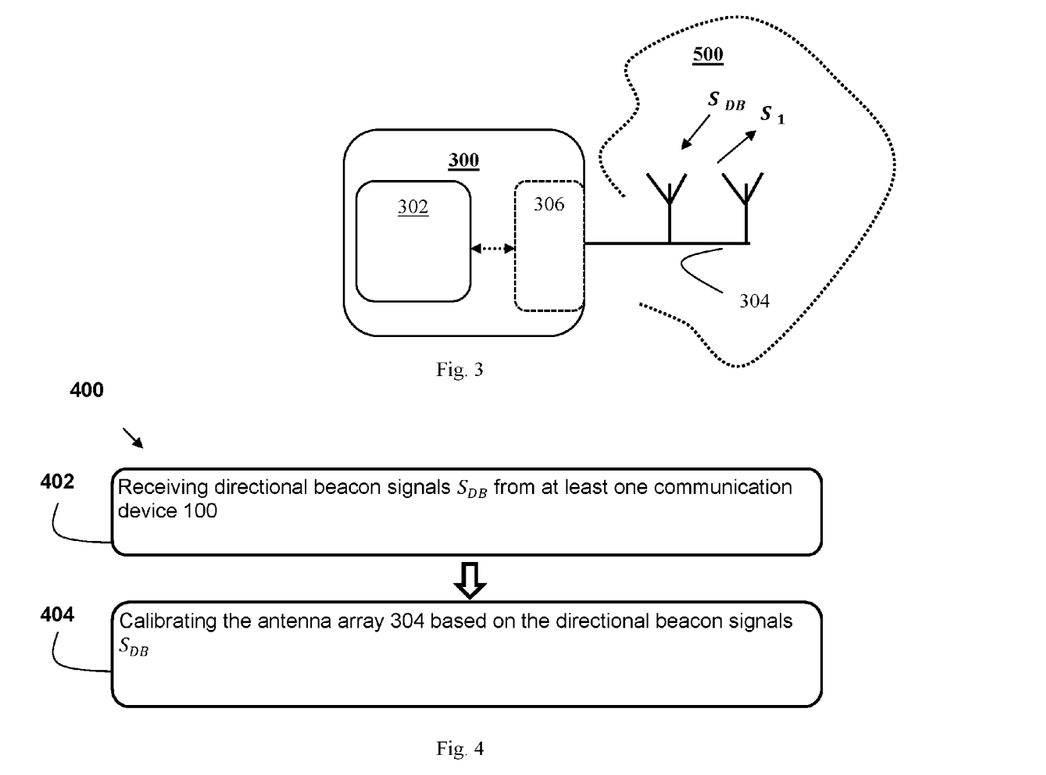
FIG. 3 shows an access node according to an embodiment of the present invention.
FIG. 4 shows another method according to an embodiment of the present invention.

FIG. 3 shows an access node 300 according to an embodiment of the present invention. The access node 300 comprises a processor 302 and an antenna array 304. The processor 302 and the antenna array 304 are communicably coupled to each other via in this example a transceiver unit 306 and communication means (illustrated with dashed arrow). The antenna array 304 of the access node 300 is configured to receive directional beacon signals $S_{DB}$ from at least one communication device 100. However, the antenna array 304 may also receive direction beacon signals from a plurality of communication devices. The directional beacon signals are forwarded to the processor 302 of the access node 300. After receiving the directional beacon signals the processor 302 is configured to calibrate the antenna array based on the directional beacon signal(s). In this respect a calibration algorithm/method is used which is explained in the following description.

FIG. 4 shows a corresponding method 400 according to an embodiment of the present invention. The method 400 may be executed in an access node 300, such as the one shown in FIG. 3. The method 400 comprises the step of receiving 402 directional beacon signals $S_{DB}$ from at least one communication device 100. The method 400 further comprises the step of calibrating the antenna array 304 based on the directional beacon signals $S_{DB}$.

Consequently, embodiments of the present invention propose using communication devices that are capable of making directional transmissions with directional beacon signals to assist calibrating antenna arrays at access nodes of wireless communication systems. Such directional transmissions may be in the same frequency band(s) as the frequency bands used by the antenna array of the access node 300.

The communication device 100 may be equipped with antenna arrays or other type of directional antennas, such as leaky-wave antennas, that allow directional transmissions in the wireless communication system 500.

The antenna array 304 of the access node 300 is often an arrangement of antennas configured for positioning and/or wireless communications. The antenna array 304 can e.g. be arranged in a linear or circular geometry. The number of antenna elements (not shown in the Figs.) forming an antenna array 304 may vary among the access nodes 300, and range from a single element to tens of elements. These antenna arrays 304 are e.g. used in MIMO communications as well as for highly accurate positioning of mobile (or static) communication devices.

Moreover, it does not matter whether the communication device 300 is static or mobile. The communication device 100 according to embodiments of the present invention is also called Calibrating Node (CaNd) in this disclosure. Examples of CaNds include vehicles and neighbouring access nodes or generally any user devices with the suitable capabilities.

An example of the directional beacon signal sent by the communication device 100 to aid in the calibration of the antenna arrays of the radio access network is:

$$w(\vartheta_0,\varphi_0)s(t),$$

where $s(t) \in \mathbb{C}$ and $w(\vartheta_0,\varphi_0) \in \mathbb{C}^{N_u \times 1}$ denote a known signal and the beamformer weight-vector used for directional transmission. Here, $N_u$ denote the number of elements comprising the antenna array at the communication device 100, and the angles $(\vartheta_0,\varphi_0)$ denote the location of the access node 300 under calibration relative to the communication device 100. Such angles may be provided by the radio access network of the wireless communication system 500. The beamforming weight-vector is found as follows:

$$w(\vartheta_0, \varphi_0) = \frac{a(\vartheta_0, \varphi_0)}{\sqrt{a^H(\vartheta_0, \varphi_0)a(\vartheta_0, \varphi_0)}},$$

where $a(\vartheta_0,\varphi_0) \in \mathbb{C}^{N_u \times 1}$ denote the response vector of the antenna array at the communication device 100.

According to yet another embodiment, the first signal $S_1$ further indicates the spatial position of the access node 300. The spatial position can e.g. be represented in Cartesian coordinates.

According to an embodiment, the first signal $S_1$ further indicates the direction from the communication device 100 towards the access node 300. This direction may be represented in e.g. spherical coordinates.

According to an embodiment, the antenna array 304 of the access node 300 further is configured to transmit a second signal $S_2$ to the communication device 100. The second signal $S_2$ indicates a Mobility Beacon Request (MBR). The directional antennas 104 of the communication device transmit a mobility beacon signal $S_{MB}$ to the access node 300 in response to the MBR. The antenna array 304 of the access node 300 is further configured to receive the mobility beacon signal $S_{MB}$ from the communication device 100. The processor 302 is further configured to estimate the spatial position of the communication device 100 based on the mobility beacon signal $S_{MB}$. The estimated spatial position of the communication device 100 is thereafter used by the processor 302 of the access node 300 to calibrate the antenna array 304.

Well known methods in the art may be used by the processor 302 for estimating the spatial position of the communication device 100. Two such methods are time-of-arrival method or an observed time-of-arrival method. The mentioned methods acquire the travel time needed for the directional beacon signal to propagate from the communication device 100 to the access node 300.

According to yet another embodiment, the directional antennas 104 of the communication device 100 and the antenna array 304 of the access node 300 use the same frequency bands for the above described signalling related to antenna calibration. This means that the directional beacon signals $S_{DB}$ are transmitted in common transmission frequency bands.

Figure 5:
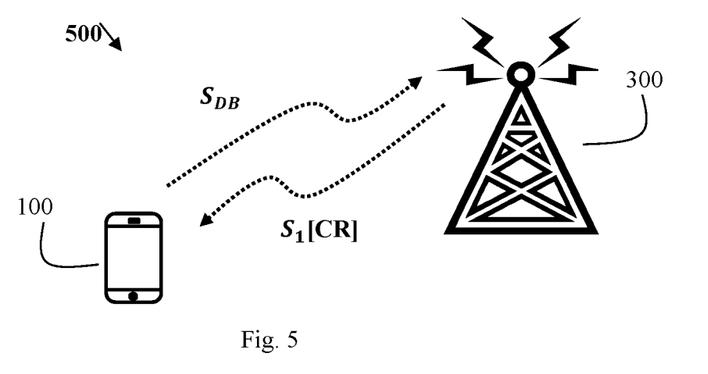
FIG. 5 shows a flowchart of a method in a wireless communication system according to an embodiment of the present invention.
Figure 6:
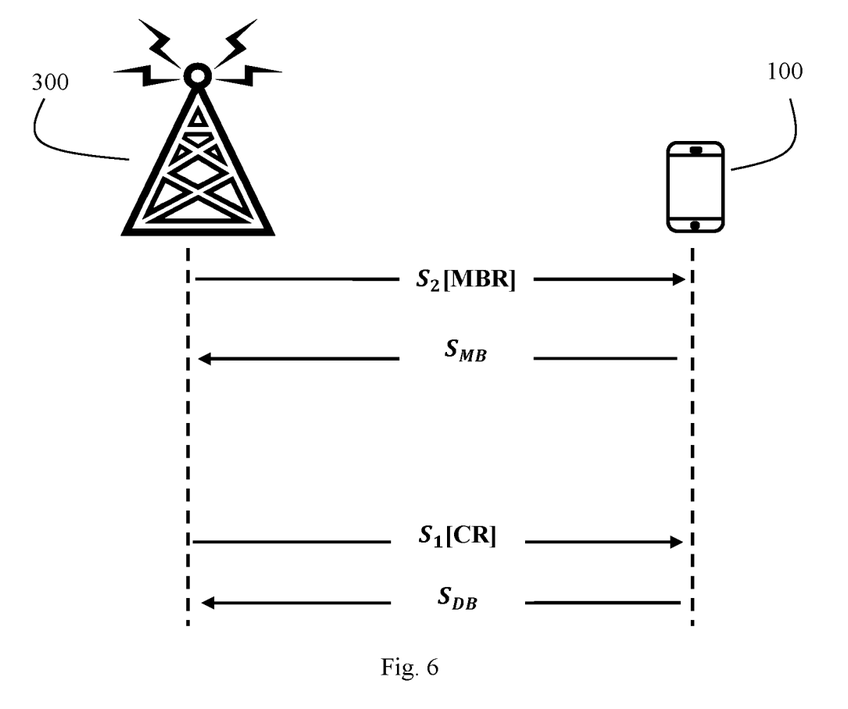
FIG. 6 illustrates signalling aspects in a wireless communication system according to an embodiment of the present invention.

FIG. 5 illustrates the interaction between the communication device 100 and access node 300 according to the present solution for calibration while FIG. 6 illustrates the signalling aspects in the wireless communication system 500 between the communication device 100 and access node 300.

In FIG. 5, the access node 300 transmits the first signal $S_1$ to the communication device 100 for initiating calibration. The first signal $S_1$ comprises a CR as mentioned above. The communication device 100 receives the first signal $S_1$ and thereafter transmits a directional beacon signal $S_{DB}$ to the access node 300. The access node 300 receives the directional beacon signal $S_{DB}$ and uses the directional beacon signal $S_{DB}$ in a suitable calibration method.

In FIG. 6 the message sequence diagram of an embodiment for calibration of antenna arrays in the wireless communication system 500 is illustrated. The communication device 100 is requested by the radio access network to make a directional beacon signal transmission. This is achieved by the radio access network transmitting a first signal $S_1$ comprising the CR message. It is noted that in the example in FIG. 6 the CR is transmitted by the access node 300 which intends to calibrate its antenna array 304. However, other network entities of the wireless communication system 500 may transmit and/or control the calibration in the wireless communication system 500. The other network entities may e.g. be other access nodes, central control nodes such as radio network controllers, or dedicated network calibration control nodes configured for the controlling of calibration in the whole or parts of the wireless communication system 500.

The CR message is received by the communication device 100 and in response to the CR the communication device 100 transmits directional beacon signals in the direction towards the access node 300. Such directional beacon signals are used for calibration of the antenna array 304 at the access node 300.

In an embodiment also illustrated in FIG. 6, the radio access network may request the communication device 100 to broadcast a mobility beacon signal $S_{MB}$ in order to estimate the position of the communication device 100 prior to the calibration procedure. The mobility beacon is requested in a Mobility Beacon Request (MBR) message transmitted in a second signal $S_2$ from the access node 300 to the communication device 100. In this example the second signal $S_2$ is transmitted by the access node 300, but other network entities can transmit the second signal $S_2$. The mobility beacon may be a wideband or a narrowband transmission that is used regularly by the radio access network in order to estimate the position of the communication device 100. For the sake of clarity, this example considers a single access node 300 and communication device 100. However, an antenna array of an access node 300 may be calibrated simultaneously using multiple communication devices.

When the radio access network of the wireless communication system 500 decides to calibrate the antenna arrays at the access node 300 the radio access network sends a CR message to the communication devices 100 (those that can make directional transmissions) with the relative location (the location of the access node with respect to the location of the communication device) of the access nodes equipped with the antenna array that needs to be calibrated. The communication device 100, now playing the role of CaNds, sends a directional beacon $S_{DB}$ to the location of the access node 300. These directional beacons $S_{DB}$ are used for calibration of the antenna arrays of the access node 300.

Figure 7:
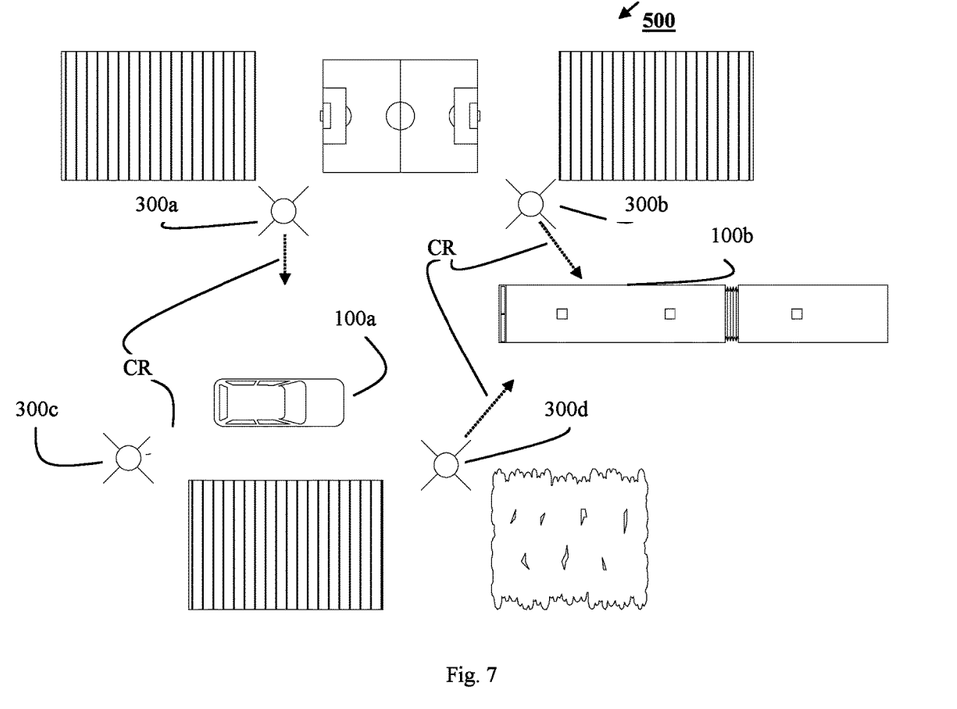
FIG. 7 illustrates yet further aspects of a wireless communication system according to an embodiment of the present invention.
Figure 8:
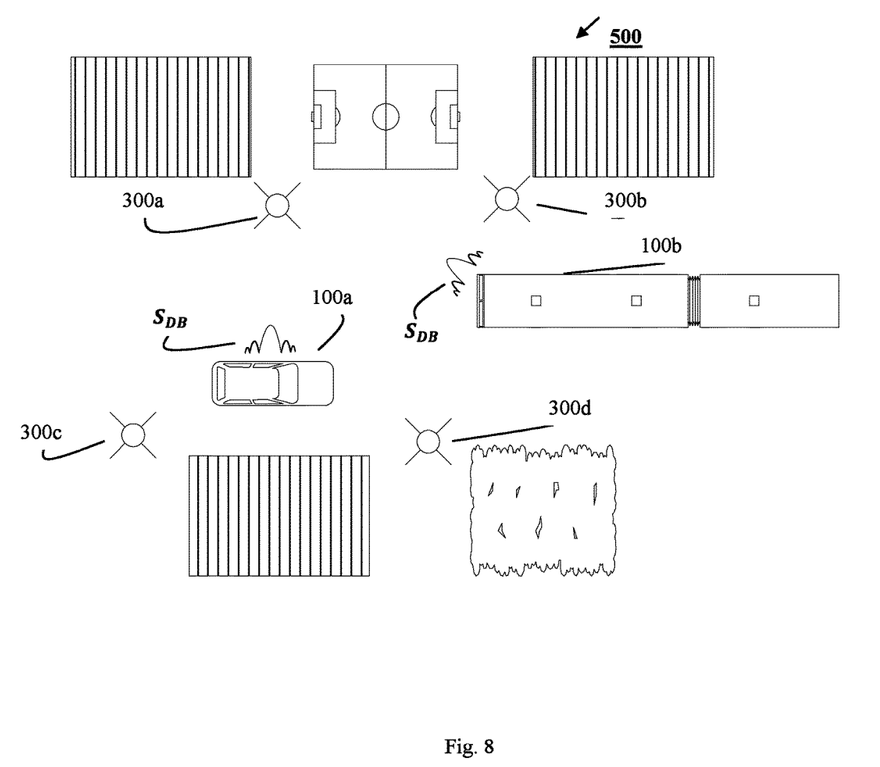
FIG. 8 illustrates yet further aspects of a wireless communication system according to an embodiment of the present invention.

As understood from the description of the communication device 100 above, the access node 300 further is configured to transmit one or more CRs in first signals $S_1$ to communication devices according to an embodiment of the present invention. Also understood from the description, the CR may be sent by other network entities of the wireless communication system 500. The purpose of the CR is to activate the communication devices 100 that can assist in the calibration procedure. FIGS. 7 and 8 illustrates such an example in an urban environment with cars and buses surrounded by parks and buildings.

FIGS. 7 and 8 illustrates the proposed present solution for calibration of antenna arrays in the wireless communication system 500. The wireless communication system 500 is in this example set in an urban city environment.

In FIG. 7 the access nodes 300a, 300b, 300c, 300d send CRs to the communication devices 100a, 100b which are capable of directional beacon transmissions in the wireless communication system 500. The CRs are for calibration of the antenna array of the access node 300a.

In FIG. 8 the communication devices 100a, 100b respond by making a directional beacon signal transmission towards the location of the access nodes 300a under calibration. In the example in FIG. 8 it is also noted that the communication devices 100a, 100b are moving in city traffic as a car and a bus.

After reception of the directional beacon signals from communication devices 100a, 100b, the access node 300a under calibration performs the calibration of its own antenna array 304. The proposed directional beacon signal $S_{DB}$ that is transmitted by the communication devices 100a, 100b and the proposed algorithm for doing the calibration computation is described next.

Therefore, according to yet another embodiment the processor 302 of the access node 300 is further configured to calibrate the antenna array 304 using a calibration algorithm based on an effective aperture distribution function, EADF, of the antenna array 304.

Figure 9:
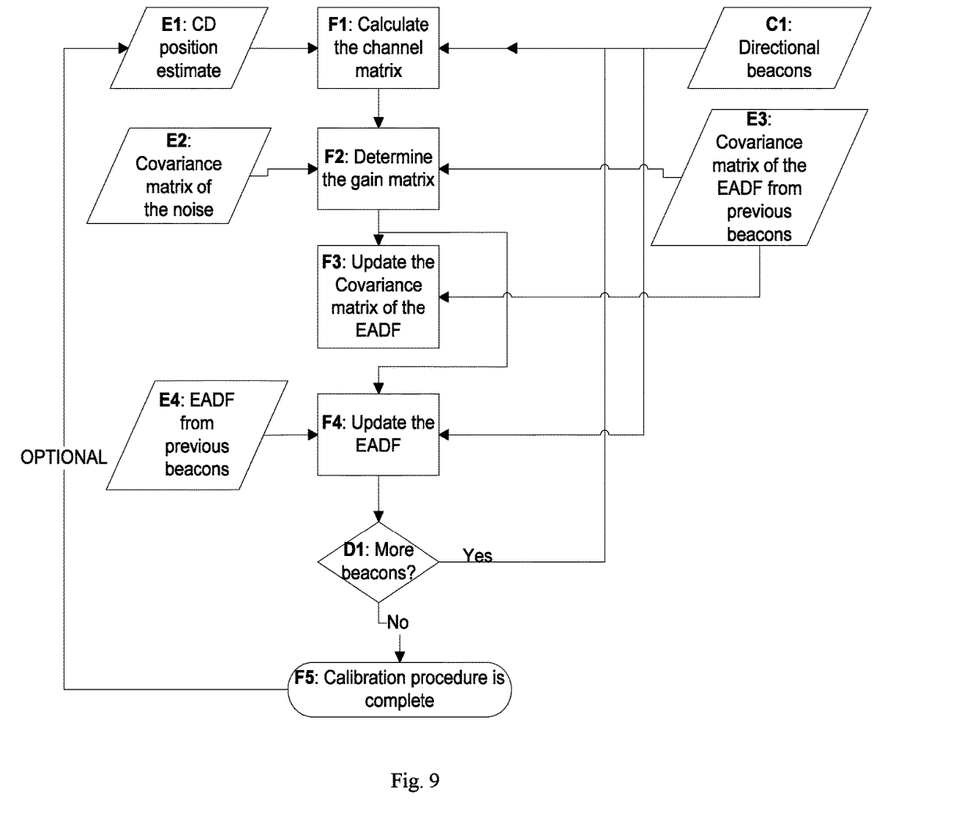
FIG. 9 shows a flowchart of a calibration method according to an embodiment of the present invention.

FIG. 9 shows a calibration algorithm according to the mentioned embodiment in which EADF is used. Let $x[t] \in C^{N \times 1}$ denote the output of the antenna array 104 under calibration upon reception of the directional beacon signals. Here, t denotes the time-instant at which the directional beacon signal is received by the access node 300 under calibration, and N denotes the number of antennas comprising the antenna array. Let also $\hat{g}[t] \in C^{MN \times 1}$ denote the EADF of the antenna array under calibration. The EADF is a compact description of the antenna array 304 response function, and it is defined as the 2-D discrete Fourier transform of the calibration matrix of the antenna array. Here, M denotes the number of modes of the EADF, respectively. With reference to FIG. 9 the calibration algorithm involves and comprises:

- In F1 the channel matrix is calculated based on the directional beacon signal(s) from the Communication Device (CD) 100 in C1 and optionally on the estimated position of the CD 100 from E1.
- In F2 the (Kalman) gain matrix is determined using the channel matrix calculated in F1 and a predefined noise covariance matrix from E2.
- In E3 the covariance matrix of the EADF(s) from the previous directional beacon signal(s) is obtained and used in F2 for determining the gain matrix if the EADF(s) from the previous directional beacon signal(s) should be used in the calibration algorithm.
- In F3 the covariance matrix of the EADF is updated based on the (Kalman) gain matrix from F2 and the channel matrix from F1. Optionally the covariance matrix of the EADF(s) from the previous directional beacon signal(s) from E3 is also used in F3.
- In F4 the EADF is updated based on the directional beacon signal(s) from C1 as well as the EADF from the previous beacon signal(s) from E4 and the gain matrix is used in F2.
- In D1 it is determined if more directional beacon signals should be used in the calibration algorithm. If YES in D1 the calibration algorithm returns to F1. If NO in D1 the calibration algorithm goes to F5.
- In F5 the calibration algorithm is complete and the updated EADF is stored as the calibrated antenna array, e.g. in a memory (not shown) of the access node 300. The covariance matrix of the EADF is stored as well in F5. Optionally the calibration algorithm goes to D1 in case the calibration algorithm needs to determine the position of the CD 100 for the optional input to D1.

Furthermore, any method according to the present invention may be implemented in a computer program with a program code, which when runs by a processor causes said processor to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The communication device 100 may be a user device or a radio network node. Further, the access node 300 may be a user device or a radio network node.

A radio network node or also called base station, e.g. a Radio Base Station (RBS), may in some radio networks be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a station (STA), which is any device that contains an IEEE 802.11-conformant media access control (MAC) and physical layer (PHY) interface to the wireless medium (WM).

A user device, such as User Equipment (UE) in LTE, mobile station, wireless terminal and/or mobile terminal, is enabled to communicate wirelessly in a wireless communication system, sometimes also referred to as a cellular radio system. The user device may further be referred to as mobile telephones, cellular telephones, computer tablets or laptops with wireless capability. The user device in the present context may be, for example, portable, pocket-storable, hand-held, computer-comprised, or vehicle-mounted mobile devices, enabled to communicate voice and/or data, via the radio access network, with another entity, such as another receiver or a server. The user device can be a station (STA), which is any device that contains an IEEE 802.11-conformant media access control (MAC) and physical layer (PHY) interface to the wireless medium (WM).

Moreover, it is realized by the skilled person that the present communication device 100 and access node 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. Communication device for a wireless communication system, the communication device comprising:
    a processor, and
    directional antennas;
    wherein the directional antennas are configured to receive a first signal $S_1$ indicating a calibration request (CR) for an access node;

wherein the processor is configured to generate directional beacon signals $S_{DB}$ in response to the calibration request (CR);

wherein the directional antennas further are configured to transmit the directional beacon signals $S_{DB}$ towards the access node;

wherein the directional antennas are further configured to receive a second signal $S_2$ from the access node, the second signal $S_2$ indicating a mobility beacon request (MBR), and wherein the directional antennas are further configured to transmit a mobility beacon signal $S_{MB}$ to the access node in response to the mobility beacon request (MBR).

2. Communication device according to claim 1, wherein the first signal $S_1$ further indicates the spatial position of the access node.

3. Communication device according to claim 1, wherein the first signal $S_1$ further indicates the direction from the communication device towards the access node.

4. Communication device according to claim 1, wherein the directional beacon signals $S_{DB}$ are transmitted in common transmission frequency bands.

5. Method for a wireless communication system, the method comprising;
   receiving a first signal $S_1$ indicating a calibration request (CR) for an access node,
   generating directional beacon signals $S_{DB}$ in response to the calibration request (CR),
   transmitting the directional beacon signals $S_{DB}$ towards the access node;
   receiving a second signal S from the access node, the second signal S indicating a mobility beacon request (MBR), and
   transmitting a mobility beacon signal $S_{MB}$ to the access node in response to the mobility beacon request (MBR).

6. Non-transitory computer readable medium storing program code for performing a method according to claim 5 when the computer code runs on a computer.

\* \* \* \* \*

UNITED STATES PATENT AND TRADEMARK OFFICE
CERTIFICATE OF CORRECTION

PATENT NO. : 10,531,465 B2
APPLICATION NO. : 15/706154
DATED : January 7, 2020
INVENTOR(S) : Costa et al.

Page 1 of 1

It is certified that error appears in the above-identified patent and that said Letters Patent is hereby corrected as shown below:

In the Claims

Claim 5, Column 14, Lines 12-13:
"receiving a second signal S from the access node, the second signal S indicating"
Should read:
-- receiving a second signal $S_2$ from the access node, the second signal $S_2$ indicating --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*